United States Patent [19]

Foster

[11] Patent Number: 5,210,658
[45] Date of Patent: May 11, 1993

[54] SIGHT GLASS ASSEMBLY

[75] Inventor: Robert J. Foster, Leawood, Kans.

[73] Assignee: PresSure Products Company, Inc., Charleston, W. Va.

[21] Appl. No.: 836,364

[22] Filed: Feb. 18, 1992

[51] Int. Cl.⁵ .......................... G02B 5/00; G02B 7/00; G01F 23/02
[52] U.S. Cl. ...................... 359/894; 73/323; 73/329; 73/330; 73/334
[58] Field of Search ................ 359/894; 73/323, 330, 73/334, 328, 329, 331; 109/58.5

[56] References Cited

U.S. PATENT DOCUMENTS

| | | |
|---|---|---|
| 2,461,989 | 2/1949 | Le Roy . |
| 2,942,469 | 6/1960 | Le Roy . |
| 3,148,543 | 9/1964 | Le Roy ........................ 359/894 |
| 3,307,400 | 3/1967 | Le Roy ........................ 359/894 |
| 3,345,872 | 10/1967 | Meginnis . |
| 3,407,662 | 10/1968 | Tarbox ........................ 359/894 |
| 3,625,390 | 12/1971 | Meginnis . |
| 3,746,431 | 7/1973 | Meginnis . |
| 3,942,881 | 3/1976 | Meginnis ...................... 359/894 |
| 3,951,301 | 4/1976 | Meginnis ...................... 359/894 |
| 3,977,251 | 8/1976 | Meginnis ...................... 359/894 |
| 4,372,652 | 2/1983 | Pontefract ..................... 359/894 |
| 4,436,375 | 3/1984 | Meginnis ...................... 359/894 |

Primary Examiner—Bruce Y. Arnold
Assistant Examiner—R. D. Shafer
Attorney, Agent, or Firm—Lalos & Keegan

[57] ABSTRACT

A sight glass assembly generally consisting of a first housing section having an opening therethrough mountable on a vessel wall, a second vessel section having an opening therethrough registrable with the first housing section opening when the first housing section is disposed in assembled relation with the second housing section, a pair of lenses disposed in the housing sections across the openings thereof, provided with beveled surfaces along the mating surfaces thereof, a packing member disposed between annular side walls of the lenses and the housing sections, and means for urging the housing sections together to compress the packing material and cause it to expand laterally to place the lenses in radial compression to maintain their structural integrity upon being fractured. The inner wall of the packing engaging the annular side walls of the lenses is provided with an annular recess registrable with the mating surfaces of the lenses which permits material of the packing to flow therein during compression thereof and thus avoid such material from being forced between the beveled edges of the lenses to force the lenses apart by a wedging action.

21 Claims, 3 Drawing Sheets

SIGHT GLASS ASSEMBLY

BRIEF SUMMARY OF THE INVENTION

The present invention relates to a sight glass assembly and more particularly to a safety sight glass assembly used extensively in the chemical, petrochemical and food processing industries wherein the lenses of such assemblies are placed under radial compression to prevent blow outs of the lenses when the lenses are mounted on vessels under compression and become fractured.

In the prior art, there has been developed a safety sight glass adapted to be mounted over an opening in a vessel wall for viewing the interior of the vessel. Often, such assemblies are mounted on vessels containing a fluid under pressure which also may be explosive, toxic or otherwise hazardous to the environment. Typically, the lenses of such assemblies are placed under radial compression so that upon fracture of such lenses the lenses will be caused to remain intact and not blow out by the pressurized fluid within the vessel.

Generally, such assemblies include a first housing section having an opening therethrough registrable with the opening in the vessel wall when the first housing section is mounted on the vessel wall, a second housing section mountable on the first housing section, a pair of lenses mounted across the openings in the housing sections and a packing disposed between the side walls of the lenses and recessed packing bearing walls in the housing sections. With the components of such units assembled in such manner and the housing sections being forced together by means of bolts, clamps or other means, the packing bearing walls of the housing sections are caused to engage the packing member and expand it laterally to place the lenses in radial compression thus enhancing their ability to remain intact upon becoming fractured and being subjected to high pressures by the fluid contained within the vessel.

In many of such applications, in order to provide units capable of withstanding elevated pressures, it is necessary to provide lens thicknesses greater than the thicknesses of commercially available lenses. Under such circumstances, commercially available lenses are adhesively secured together or laminated to provide a desired lens thickness. Generally, such lenses are provided with beveled mating surfaces which provide a problem when used with the type of safety sight glass as described. In particular, the problem is caused by the fact that upon bolting or clamping the housing sections together to laterally expand the packing to place the lenses in radial compression, packing material is caused to be forced between the beveled surfaces about the periphery of the laminated lenses and thus wedge the lenses apart. After a period of time with such wedging action occurring, the adhesive bond between the lenses may be caused to weaken, resulting in a possible separation of the lenses. Such separation can result in a diminution in the structural integrity of the unit and/or a distortion of the viewing through the lenses. It thus has been found to be desirable to provide a unit of the type described in which the condition of a possible separation of the lenses by a wedging action of the packing material forced between mating surfaces of the lenses is avoided.

Accordingly, it is the principal object of the present invention to provide an improved sight glass assembly.

Another object of the present invention is to provide an improved safety sight glass assembly.

A further object of the present invention is to provide an improved safety sight glass adapted for use in the chemical, petrochemical and food processing industries.

A still further object of the present invention is to provide an improved safety sight glass adapted for use in viewing the interior of a vessel containing a fluid under pressure.

Another object of the present invention is to provide an improved safety sight glass adapted for use on a vessel containing a fluid under pressure which is capable of maintaining the lens thereof intact upon fracture of the lens.

A further object of the present invention is to provide an improved safety sight glass utilizing at least two laminated lenses placed under radial compression in which the mating surfaces of such lenses are prevented from separating.

A still further object of the present invention is to provide an improved safety sight glass of the type utilizing a pair of laminated lenses having a packing member disposed about the peripheries thereof and forced into contact therewith to place the lenses in radial compression, in which the forced entry of the packing material between the laminated lenses, causing the mating surfaces of the lenses to separate, is avoided.

Another object of the present invention is to provide an improved packing for a sight glass assembly utilizing the packing for placing a pair of laminated lenses in radial compression.

Other objects and advantages of the present invention will become more apparent to those persons having ordinary skill in the art to which the present invention pertains from the following description taken in conjunction with the accompanying drawings wherein:

DETAILED DESCRIPTION

Figure 3:
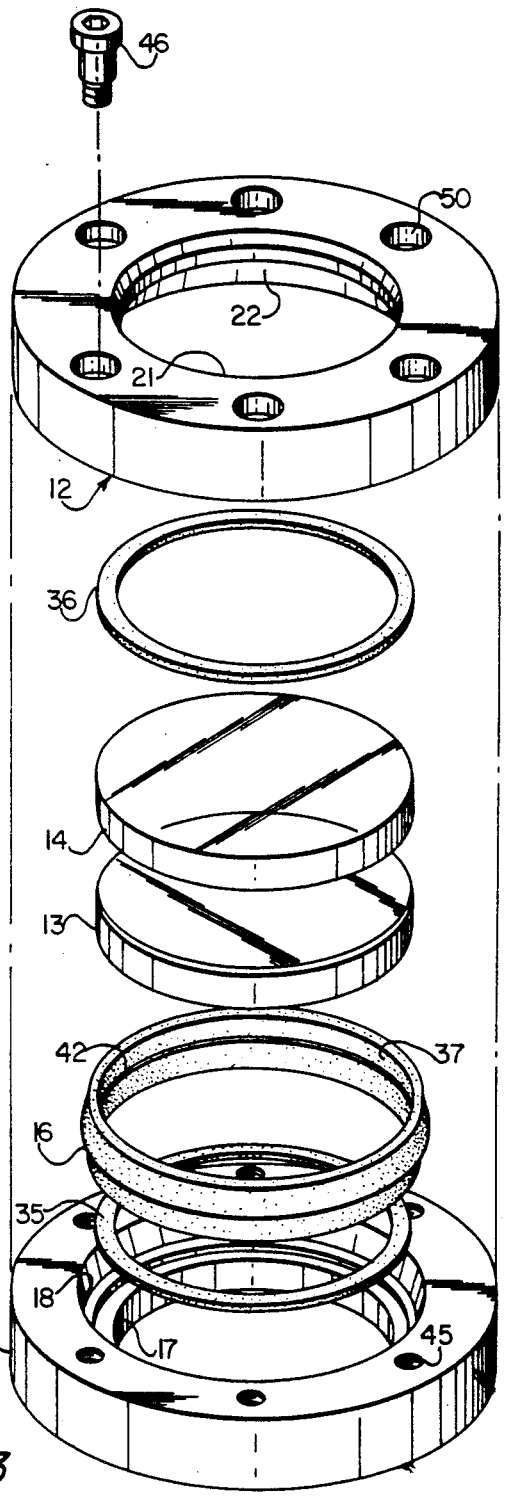
FIG. 3 is an exploded view of the embodiment illustrated in FIGS. 1 and 2.
Figure 4:
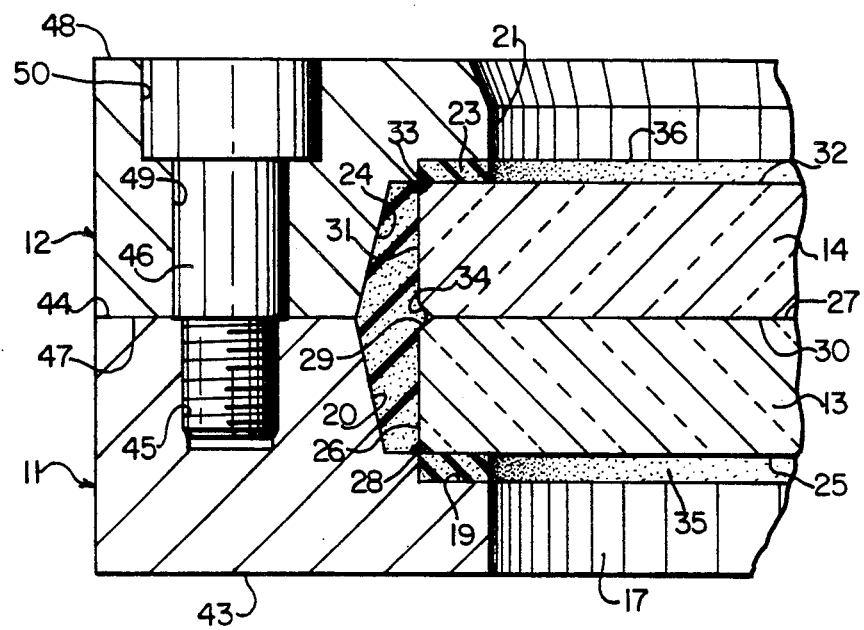
FIG. 4 is an enlarged, fractional view of a portion of the embodiment shown in FIG. 2.

Referring to the drawings, there is illustrated a sight glass assembly 10 generally including an inner housing section 11, an outer housing section 12, a pair of laminated lenses 13 and 14 and a compressible packing member 16. Inner housing section 11 generally has an annular configuration, providing an opening 17 therein adapted to register with an opening in a wall of a vessel containing a fluid possibly corrosive in nature and at an elevated pressure. The inner housing section shown in the drawings is secured to the fluid vessel by welding. However, the inner housing section alternatively may be secured to the fluid vessel by means of a plurality of bolts extending through suitable openings circumferentially spaced in the inner housing section, which are adapted to register with tapped holes in the wall of the fluid vessel. As best shown in FIGS. 3 and 4, opening 17 in the inner housing section is provided with an enlarged section 18 which provides an annular lens seating surface 19 and a frusto-conically configured packing bearing surface 20.

Figure 1:
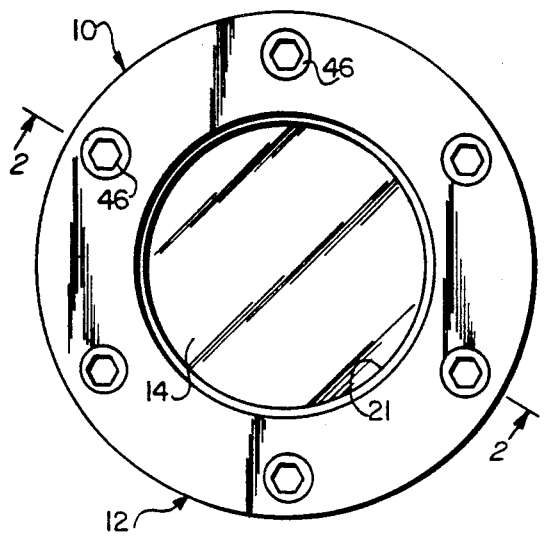
FIG. 1 is a top plan view of an embodiment of the present invention.
Figure 2:
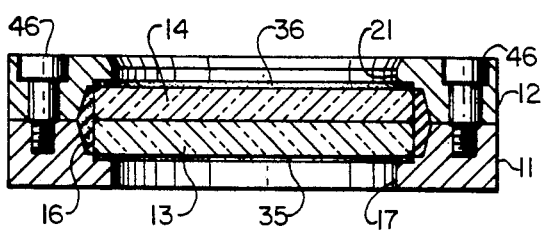
FIG. 2 is a cross-sectional view taken along line 2—2 in FIG. 1.

Outer housing section 12 is similar in configuration to inner housing section 11 and includes an opening 21 therein which registers with opening 17 of the inner housing section. Opening 21 is provided with an enlarged section 22 providing an annular lens seating surface 23 disposed in opposed relation to lens seating surface 19, and a frusto-conically shaped packing bearing surface 24 cooperating with packing bearing surface 20 when the housing sections are in their assembled condition as shown in FIGS. 2 and 4.

Lens 13 is provided with an inner surface 25, an annular side surface 26 and an outer mating surface 27. As best shown in FIG. 4, inner and outer surfaces 25 and 27 of lens 13 are provided with beveled surfaces 28 and 29. Lens 14 is similarly configured including an inner mating surface 30, an annular surface 31 and an outer surface 32. Lens 14 further is provided with beveled surfaces 33 and 34. Prior to assembly, the lens unit is preassembled by adhesively securing the mating surfaces of lenses 13 and 14 together to provide the desired lens thickness corresponding to the desired rating of the entire assembly. The lenses are secured together by means of a suitable adhesive or cement which is transparent so as not to obscure viewing through the lens. When the lens unit is in the assembled condition as shown in FIG. 4, lens surfaces 25 and 32 will be seated on lens seating surfaces 19 and 23 with suitable gaskets 35 and 36 interposed therebetween, respectively, and annular side walls 26 and 31 will be disposed in opposed relation to packing bearing walls 20 and 24, respectively, with packing member 16 interposed therebetween.

Figure 7:
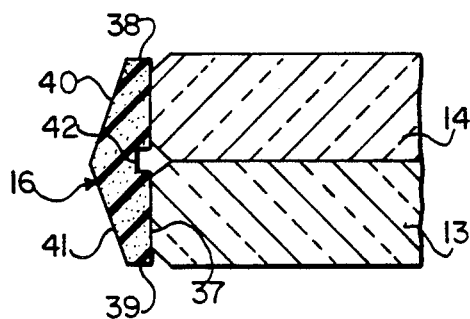
FIG. 7 is a view of a laminated lens provided with an improved packing member in the uncompressed state.
Figure 8:
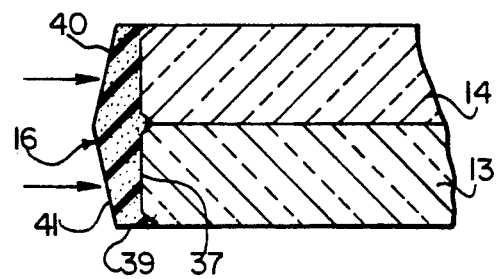
FIG. 8 is a view similar to the view shown in FIG. 7 illustrating the packing member in the compressed state and the laminated lenses disposed in an intact condition.

As best shown in FIGS. 3 and 7, packing member 16 includes an annular inner wall 37, end walls 38 and 39 and a pair of frusto-conically shaped outer wall sections 40 and 41. In the assembled condition, the packing is adapted to be received in enlarged sections 18 and 22 of the housing sections with inner wall 37 engaging the annular side walls 26 and 31 of lenses 13 and 14 and outer wall sections 40 and 41 engaging bearing contact surfaces 24 and 20, respectively.

Inner wall 37 of packing member 16 is provided with an annular recess 42 which is adapted to be disposed in the plane of the mating surfaces of the lenses and in opposed relation to the recess defined by beveled surfaces 29 and 34 of the lenses. As shown, annular recess 42 has a rectangular cross-sectional configuration although such cross-sectional configuration can be of any shape. In addition, the cross-sectional configuration of the packing is slightly oversized relative to the cross-sectional area of the space provided between the lenses and the housing sections to permit the compression and lateral expansion of the packing in a manner to be described.

Housing section 11 is provided with an inner mounting surface 43 and an outer mounting surface 44. Inner mounting surface 43 is adapted to be mounted on the vessel wall with housing section opening 17 registering with the opening in the vessel wall. The configuration of mounting surface 43 can be either planar curved to correspond with the shape of the vessel wall upon which housing section 11 is to be mounted. In the particular embodiment as shown, housing section 11 is intended to be welded onto the vessel wall. Outer mounting surface 44 is provided with a set of circumferentially spaced, tapped holes 45 for securing the outer housing section to the inner housing section by means of a set of cap screws 46.

Outer housing section 12 is provided with an inner mounting surface 47 adapted to engage inner housing section surface 44 with housing section opening 21 being registered with housing section opening 17, and an outer surface 48 provided with a plurality of cap screw openings 49. Each of the cap screw openings is adapted to register with a tapped hole in the inner housing section, and is provided with enlarged section 50 or socket for accommodating the head portion of the cap screw. The dimensions of the cap screw openings 49 and the cap screws are selected so that upon insertion of the cap screws and a bottoming of the cap screw heads, a sufficient amount of force will be applied to the outer peripheries of lens surfaces 25 and 32 to compress cushioning gaskets 35 and 36 to provide a suitable cushioning and sealing action yet insufficient to place the lenses in tension. Simultaneously, the tightening of cap screws 46 will cause packing member 16 to be compressed longitudinally and expand laterally to place the lenses in radial compression.

In the installation of the sight glass assembly as described, housing section 11 is first positioned on the vessel wall with opening 17 disposed in registry with the opening in the vessel wall. With the housing section thus positioned, it is welded onto the vessel wall. With the inner housing section thus mounted, gasket 35 is placed on gasket seating surface 19, packing member 16 is mounted on a laminated lens unit, the lens unit with the packing applied is inserted in the enlarged section of the inner housing section opening so that the peripheral portion of lens surface 25 is seated on gasket 35 and outer packing wall section 41 engages packing bearing wall 20, gasket 36 is placed about the periphery of outer lens surface 32, outer housing section 12 is mounted on the inner housing section with packing wall section 40 engaging packing bearing wall 24, outer housing section 12 engaging gasket 36 and cap screw holes 49 registering with tapped holes 45, and cap screws 46 are inserted through openings 49 and threaded into the tapped holes until the mid-shank portions of the cap screws bottom-out, applying the desired amount of pressure on the peripheral portions of lens surfaces 25 and 32 and compressing the packing longitudinally, causing it to expand laterally.

In the uncompressed state, the packing will be disposed relative to the lenses as illustrated in FIG. 7. Upon tightening of the cap screws, drawing the housing sections together, packing bearing walls 20 and 21 and the end walls of the enlarged housing section openings will cause the packing member to compress longitudinally and expand laterally to place the lenses in radial compression. As the packing material is compressed and caused to expand laterally, material in the center portion of the packing first will be caused to flow into the annular space provided by annular recess 42 and then will be caused to partially enter the recess provided by beveled surfaces 29 and 34 of the laminated lens. The cross-sectional configuration of recess 42 is formed of a sufficient area to permit the flow of packing material therein as the packing material is compressed, and is large enough to prevent the packing material from flowing between the beveled surfaces of the lenses and forcing them apart in a wedging action as in prior art constructions.

Figure 5:
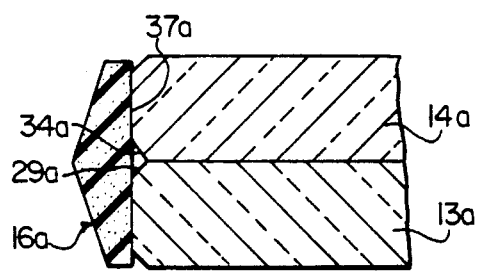
FIG. 5 is a cross-sectional view of a laminated lens having a packing member mounted about the periphery thereof, representing a prior art construction wherein the packing member is in an uncompressed state.
Figure 6:
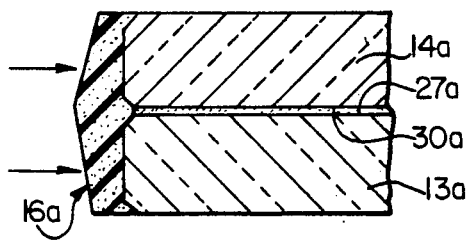
FIG. 6 is a view similar to the view shown in FIG. 5 with the packing member shown in the compressed state and the lenses having been separated under compressive force of the packing member.

FIGS. 5 and 6 illustrate prior art constructions in the uncompressed and compressed states of the packing. In FIG. 5, it is to be noted that the inner wall 37a of packing 16a is formed without an annular recess lying in the plane of the mating surfaces of lenses 13a and 14a and in opposed relation to the recess defined by the beveled surfaces provided on the peripheries of the mating surfaces. Upon compression of packing 16a as shown in FIG. 6, the lateral expansion of the packing will cause material in the midsection thereof to be forced into the peripheral recess formed by beveled edges 29a and 34a to provide a wedging action tending to force lenses 13a and 14a apart and weaken the adhesive bond between the lenses. Under such conditions, the structural integrity of the lens unit will be impaired, reducing the effectiveness of the assembly. With the provision of annular recess 42 as provided in the present invention, however, such wedging action is avoided thus maintaining the structural integrity of the assembly.

In the manufacture of the sight glass assembly as described, the housing sections may be formed of any suitable material having sufficient strength properties, such as mild steel or stainless steel. The lens materials may be either glass or plastic depending on the particular application. Gaskets 35 and 36 may be formed of any suitable material such as TEFLON. The particular material of gasket 35 would depend upon the material within the vessel. In many instances, a corrosive resistant material would be required. The packing also may be formed of any suitable material which may be compressed to place the lens unit in radial compression. The packing may be formed of silicone rubber, VITON or TEFLON.

To provide an effective and reliable sight glass assembly of the type described, it is particularly important that undue force not be applied to the inner and outer surfaces of the lens unit so as to place the lens unit in tension, and to apply a uniformly distributed lateral force on the annular side wall of the lens unit to place the lens unit in radial compression. Under such conditions, upon one or both of the lenses being fractured, the compressive forces applied to the fractured lens will cause the lens to remain intact, preventing a blow out and permitting the vessel to be depressurized and the sight glass assembly to be replaced.

Figure 9:
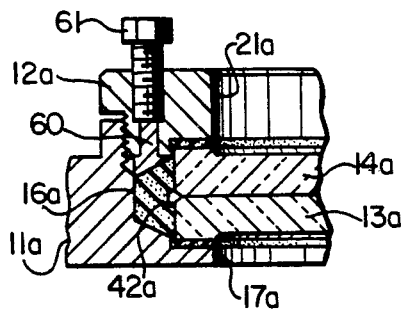
FIGS. 9 through 13 are cross-sectional views taken along line 2—2 in FIG. 1 of alternative embodiments of the present invention.

FIGS. 9 through 13 illustrate various additional embodiments of the invention which are comparable to the embodiment shown in FIGS. 1 through 4, 7 and 8. The embodiment shown in FIG. 9 includes housing sections 11a and 12a having openings 17a and 21a, respectively, a pair of laminated lenses 13 and 14 disposed between the housing sections, a packing member 16a disposed in the enlarged opening section of housing section 11a and a compression ring 60 disposed in the enlarged opening section of housing section 11a. Housing section 12a is provided with a set of compression screws 61 which are adapted to be threaded against the compression ring to compress the packing and cause it to expand laterally to place lenses 13a and 14a into radial compression. The general type of sight glass assembly shown in FIG. 9 is more specifically illustrated and described in U.S. Pat. No. 2,461,989 which is incorporated herein by reference. The packing member, however, is provided with an annular recess 42a which registers with a set of beveled edges of lenses 13a and 14a similar to the aforementioned embodiment.

Figure 10:
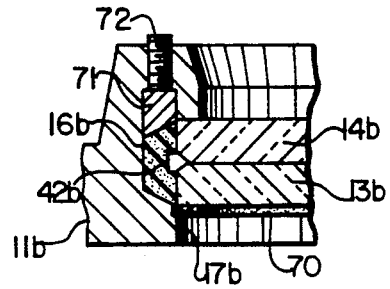

The embodiment shown in FIG. 10 is similar to the embodiment shown in FIG. 9 and includes a housing member 11b having an enlarged opening section disposed in an opening 17b a pair or laminated lenses 13b and 14b disposed within the housing and retained therein by means of a split retainer ring 70, a packing 16b disposed within the enlarged opening section of the housing member, a compression ring 71 disposed within an annular recess in the housing member and a plurality of compression screws 72 threaded into openings in the housing member and engaging the upper end of the compression ring. As in the previously mentioned embodiment, compression screws 72 may be threaded into the housing member to cause compression ring 71 to compress the packing member and expand it radially to place the lenses in radial compression.

Packing 16b similarly is provided with an annular recess 42b registrable with opposed beveled edges of the lenses into which packing material expands to prevent the wedging apart of the lenses. A more detailed illustration and description of the general type of sight glass assembly shown in FIG. 10 is provided in U.S. Pat. No. 2,942,469 which is incorporated herein by reference.

Figure 11:
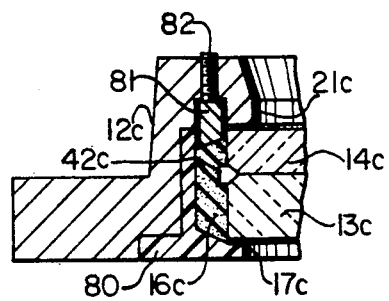

The embodiment shown in FIG. 11 includes a housing 12c with an opening 21c cooperating with an insert 80 having an opening 17c to provide an enlarged opening section, a pair of laminated lenses 13c and 14c disposed between the housing member and the insert, a packing 16c disposed in the enlarged opening section, a compression ring 81 disposed in an annular recess and the housing member and a set of compression screws 82. As in the embodiments shown in FIGS. 9 and 10, upon threading in compression screws 82, compression ring 81 will cause packing 16c to be compressed and thus expand to place the lenses in radial compression. The general type of sight glass shown in FIG. 11 is illustrated and described in more detail in U.S. Pat. No. 3,345,872 which is incorporated herein by reference. The packing of the embodiment shown in FIG. 11 further is provided with an annular recess 42c which registers with a pair of opposed beveled edges of lenses 13c and 14c.

Figure 12:
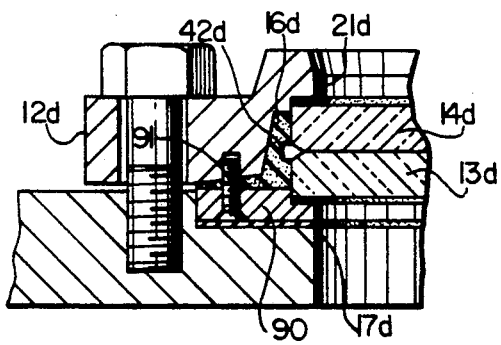

FIG. 12 shows an embodiment generally consisting of a housing member 12d having an enlarged opening section disposed in an opening 21d, ah annular plate member 90 having an opening 17d, the annular plate member cooperating with the housing member, a pair of laminated lenses 13d and 14d disposed between the housing member and the plate member, a packing 16d disposed between the housing member and the plate member and about the peripheries of the lenses and a set of screws 91 which may be utilized to draw the plate member toward the housing member to compress packing 16d and cause it to expand laterally to place the lenses in radial compression. The general type of sight glass shown in FIG. 12 is illustrated and described in greater detail in U.S. Pat. No. 3,625,390 which is incorporated herein by reference. As in the previously described embodiments, packing 16d is provided with an annular recess which registers with opposed beveled edges of lenses 13d and 14d to provide a space into which the packing material may flow to prevent the material from flowing into engagement with the opposed beveled edges of the lenses to wedge the lenses apart.

Figure 13:
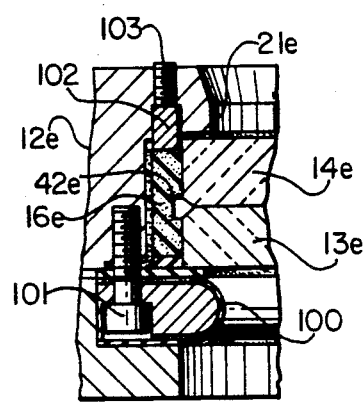

The embodiment shown in FIG. 13 includes a housing member 12e having an enlarged opening section disposed in an opening 21e, corrosive resistant annular plate member 100 secured to the housing member by means of a set of screws 101, a pair of laminated lenses 13e and 14e disposed between the housing member and plate member 100, a packing 16e disposed within the enlarged opening section, a compression ring 102 and a set of compression screws 103. The general type of sight glass shown in FIG. 13 is illustrated and described in greater detail in U.S. Pat. No. 3,746,431 which is incorporated herein by reference. By threading screws 13 inwardly against the compression ring, packing 16e will be compressed and caused to expand laterally to place the lenses in radial compression. The packing is provided with an annular recess 42e which registers with a pair of opposed, beveled edges of lenses 13e and 14e.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A sight glass assembly comprising:
   a first housing section having an opening therethrough, mountable on a vessel wall having an opening therein communicating with a fluid contained therein so that said first housing section opening registers with said vessel wall opening;
   a second housing section having an opening therethrough registrable with said first housing section opening when said first housing section is disposed in assembled condition relative to said second housing section;
   at least one of said housing section openings having an enlarged section providing a lens seating surface and a packing bearing surface;
   at least two lenses disposed in at least one of said housings section openings, said lenses having beveled adjoining surfaces, being seated on at least one of said lens seating surfaces and having annular end walls disposed in opposed relation to at least one of said packing bearing surfaces;
   a packing disposed between said annular side walls of said lenses and at least one of said packing bearing surfaces, said packing having an inner annular wall engaging the annular side wall of said lenses, said inner annular wall of said packing having a recess registrable with the adjacent beveled surfaces of said lenses when said packing is disposed in an assembled condition between said lenses and at least one of said packing bearing surfaces; and
   clamp means for urging said housing sections together, said packing occupying a portion of said recess when urged by said clamp means, whereby said packing is caused to be compressed and expanded laterally to place said lenses in radial compression and provide a fluid tight seal between at least one of said housing sections and at least one of said lenses, and said packing material is prevented from being forced between said lenses to wedge said lenses apart.

2. A sight glass assembly according to claim 1 wherein said lenses are adhesively secured together.

3. A sight glass assembly according to claim 1 wherein said lenses are secured together by a transparent adhesive.

4. A sight glass assembly according to claim 1 wherein said lenses are formed of glass.

5. A sight glass assembly according to claim 1 wherein said lenses are formed of a plastic material.

6. A sight glass assembly according to claim 1 wherein said packing is formed of a material selected from a group consisting of silicone rubber, VITON or TEFLON.

7. A sight glass assembly according to claim 1 including a gasket interposed between said one of said lenses and a lens seating surface.

8. A sight glass assembly according to claim 1 wherein said clamp means comprises a set of cap screws extending through openings in one of said housing sections and threaded into tapped holes in the other of said housing sections.

9. A sight glass assembly according to claim 1 wherein said housing sections are formed of mild steel.

10. A sight glass assembly according to claim 1 wherein said housing sections are formed of stainless steel.

11. A sight glass assembly according to claim 1 wherein said first housing section includes means for mounting said first housing section on said vessel wall.

12. A sight glass assembly according to claim 1 wherein said packing bearing surfaces are disposed at an acute angle relative to a longitudinal centerline of said first housing section opening.

13. A sight glass assembly according to claim 1 wherein said housing section openings include lens seating surfaces disposed in opposed relation to each other and cooperating packing bearing surfaces, said lenses are seating on said lens seating surfaces and said packing is engaged by said packing bearing surfaces when said housing sections are disposed in said assembled condition.

14. A sight glass assembly according to claim 13 wherein said packing bearing surfaces are disposed at an angle relative to each other when said housing sections are in the assembled condition whereby upon urging said housing sections together, said packing bearing surfaces engage said packing to place said lenses in radial compression.

15. A sight glass assembly according to claim 13 including cushioning gaskets interposed between said lenses and said lens seating surfaces.

16. A packing for a sight a glass assembly including a first housing section having an opening therethrough, mountable on a vessel wall, a second housing section having an opening therethrough registrable with said first housing section opening when said first housing section is disposed in assembled condition relative to said second housing section, at least one of said housing section openings having an enlarged section providing a lens seating surface and a packing bearing surface, at least two lenses disposed in at least one of said housing section openings, said lenses having beveled adjoining surfaces, being seated on at least one of said lens seating surfaces and having annular end walls disposed in opposed relation to at least one of said packing seating surfaces, and clamp means for urging said housing sections together, comprising:

an annular member of compressible material disposable between said annular side walls of said lenses and at least one of said packing bearing surfaces, said member having an inner annular wall engageable with the annular end walls of said lenses, said inner annular wall of said member having a recess registrable with the adjacent beveled surfaces of said lenses when said member is disposed in an assembled position between said lenses and at least one of said packing bearing surfaces, said member occupying a portion of said recess when urged by said clamp means, whereby upon said housing sections being urged together, said member is caused to expand laterally to place said lenses in lateral compression and provide a fluid-tight seal between at least one of said housing sections and at least one of said lenses and said material is prevented from being forced between said lenses to wedge said lenses apart.

17. A sight glass assembly comprising:

a first housing section having an opening therethrough, mountable on a vessel wall having an opening therein communicating with a fluid contained therein so that said first housing section opening registers with said vessel wall opening;

a second housing section having an opening therethrough registrable with said first housing section opening when said first housing section is disposed in an assembled condition relative to said second housing section;

at least one of said housing section openings having an enlarged section providing a lens seating surface and a packing bearing surface;

at least two lenses disposed in at least one of said housing section openings, said lenses having beveled adjoining surfaces, being seated on at least one of said lens seating surfaces and having annular end walls disposed in opposed relation to at least one of said packing bearing surfaces;

a packing disposed between said annular side walls of said lenses and at least one of said packing bearing surfaces, said packing having an inner annular wall engaging the annular side walls of said lenses, said inner annular wall of said packing having a recess registrable with the adjacent beveled surfaces of said lenses when said packing is disposed in an assembled condition between said lenses and at least one of said packing bearing surfaces;

a compression ring disposed in one of said housing section openings; and clamp means for urging said compression ring into engagement with said packing, said packing occupying a portion of said recess when urged by said clamp means, whereby said packing is caused to be compressed and expanded laterally to place said lenses in radial compression and provide a fluid tight seal between at least one of said housing sections and at least one of said lenses, and said packing material is prevented from being forced between said lenses to wedge said lenses apart.

18. A sight glass assembly comprising:

a housing having an opening therethrough mountable on a vessel wall having an opening therein communicating with a fluid contained therein so that said housing opening registers with said vessel wall opening;

said housing opening having an enlarged section providing a packing bearing surface;

a retainer ring disposed in said housing opening;

at least two lenses disposed between said housing and said retainer ring, said lenses having beveled adjoining surfaces, being seated on said retainer ring and having annular end walls disposed in opposed relation to said packing bearing surface;

a packing disposed between said annular side walls of said lenses and said packing bearing surface, said packing having an inner annular wall engaging the annular side walls of said lenses, said inner annular wall of said packing having a recess registrable with the adjacent beveled surfaces of said lenses when said packing is disposed in assembled condition between said lenses and said packing bearing surface;

a compression ring disposed in said enlarged housing opening section; and clamp means for urging said compression ring into engagement with said packing, said packing occupying a portion of said recess when urged by said clamp means, whereby said packing is caused to be compressed and expanded laterally to place said lenses in radial compression and provide a fluid tight seal between said housing and at least one of said lenses, and said packing material is prevented from being forced between said lenses to wedge said lenses apart.

19. A sight glass assembly comprising:

a housing having an opening therethrough, mountable on a vessel wall having an opening therein communicating with a fluid contained therein so that said housing opening registers with said vessel wall opening;

said housing opening having an enlarged section;

an insert disposed in said enlarged housing opening section providing a packing bearing surface and having a radially inwardly projecting portion providing a lens seating surface;

at least two lenses disposed in said housing opening, said lenses having beveled adjoining surfaces, being seated on said lens seating surface and having annular end walls disposed in opposed relation to said insert;

a packing disposed between said annular side walls of said lenses and said insert, said packing having an inner annular wall engaging the annular side walls of said lenses, said inner annular wall of said packing having a recess registrable with the adjacent beveled surfaces of said lenses when said packing is disposed in assembled condition between said lenses and said insert;

a compression ring disposed in said enlarged housing opening section; and clamp means for urging said compression ring into engagement with said packing, said packing occupying a portion of said recess when urged by said clamp means, whereby said packing is caused to be compressed and expanded laterally to place said lenses in radial compression and provide a fluid tight seal between said insert and at least one of said lenses, and said packing material is prevented from being forced between said lenses to wedge said lenses apart.

20. A sight glass assembly comprising:

a housing section having an opening therethrough, mountable on a vessel wall having an opening therein communicating with a fluid contained therein so that said housing opening registers with said vessel wall opening;

said housing opening having an enlarged section providing a packing bearing surface;

an annular plate mounted on said housing;

at least two lenses disposed in said housing opening, said lenses having beveled adjoining surfaces, disposed between said annular plate and said housing and having annular end walls disposed in opposed relation to a packing bearing surface of said enlarged housing opening section;

a packing disposed between said annular side walls of said lenses and said packing bearing surface, said packing having an inner annular wall engaging the annular side walls of said lenses, said inner annular wall of said packing having a recess registrable with the adjacent beveled surfaces of said lenses when said packing is disposed in assembled condition between said lenses and said packing bearing surface; and clamp means for urging said annular plate member into engagement with said packing, said packing occupying a portion of said recess when urged by said clamping means, whereby said packing is caused to compressed and expanded laterally to place said lenses in radial compression and provide a fluid tight seal between said housing and a least one of said lenses, and said packing material is prevented from being forced between said lenses to wedge said lenses apart.

21. A sight glass assembly comprising:

a housing having an opening therethrough, mountable on a vessel wall having an opening therein communicating with a fluid contained therein so that said housing opening registers with said vessel wall opening;

said housing opening having an enlarged section providing a packing bearing surface;

an annular plate member mounted on said housing;

at least two lenses disposed in said enlarged housing opening section, said lenses having beveled adjoining surfaces, being disposed between said plate member and said housing and having annular end walls disposed in opposed relation to said packing bearing surface;

a packing disposed between said annular side walls of said lenses and said packing bearing surface, said packing having an inner annular wall engaging the annular side walls of said lenses, said inner annular wall of said packing having a recess registrable with the adjacent beveled surfaces of said lenses when said packing is disposed in an assembled condition between said lenses and said packing bearing surface;

a compression ring disposed in said enlarged housing opening section; and clamp means for urging said compression ring into engagement with said packing, said packing occupying a portion of said recess when urged by said clamp means, whereby said packing is caused to be compressed and expanded radially to place said lenses in radial compression and provide a fluid tight seal between said housing and at least one of said lenses, and said packing material is prevented from being forced between said lenses to wedge said lenses apart.

* * * * *